United States Patent
Jain et al.

(10) Patent No.: US 12,393,574 B1
(45) Date of Patent: Aug. 19, 2025

(54) HIERARCHICAL AND FUNCTIONAL ASSESSMENT FRAMEWORK FOR GRAPHQL REQUESTS

(71) Applicant: Intuit Inc., Mountain View, CA (US)

(72) Inventors: Siddharth Jain, Mountain View, CA (US); Sivashanker Thiruchittampalam, Toronto (CA); Jonathan Lin, Gloucester (CA); Venkat Narayan Vedam, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/820,125

(22) Filed: Aug. 29, 2024

(51) Int. Cl.
*G06F 16/242* (2019.01)
*G06F 16/25* (2019.01)
*G06F 40/211* (2020.01)

(52) U.S. Cl.
CPC ...... *G06F 16/2425* (2019.01); *G06F 16/2433* (2019.01); *G06F 16/252* (2019.01); *G06F 40/211* (2020.01)

(58) Field of Classification Search
None
See application file for complete search history.

(56) References Cited

U.S. PATENT DOCUMENTS

| | | | |
|---|---|---|---|
| 2010/0030757 A1* | 2/2010 | Chordia | G06F 16/2423 707/769 |
| 2018/0210909 A1* | 7/2018 | Collins | G06F 16/2456 |
| 2020/0117664 A1* | 4/2020 | Kondiles | G06F 7/24 |
| 2023/0063528 A1* | 3/2023 | Ouyang | G06F 9/54 |
| 2023/0409610 A1* | 12/2023 | Gratzer | G06F 16/9024 |
| 2025/0117378 A1* | 4/2025 | Sathya | G06F 16/24553 |
| 2025/0147741 A1* | 5/2025 | Tacke | G06F 16/25 |

* cited by examiner

*Primary Examiner* — Irene Baker
(74) *Attorney, Agent, or Firm* — Dinsmore & Shohl LLP

(57) ABSTRACT

Certain aspects of the disclosure provide systems and methods for validating application programing interface requests, including GraphQL requests. In certain aspects, a method of validation includes assessing a parsability of the request, verifying the executability of the request, and evaluating a hierarchical correctness of the requests. The method may further include assigning an accuracy metric to the request based on the parsability, the executability, and hierarchical correctness of the request. If the accuracy metric satisfies a threshold, the request may be executed to generate a response.

20 Claims, 5 Drawing Sheets

HIERARCHICAL AND FUNCTIONAL ASSESSMENT FRAMEWORK FOR GRAPHQL REQUESTS

BACKGROUND

Field

Aspects of the present disclosure relate to validation of application programing interface requests, such as GraphQL requests.

Description of Related Art

GraphQL is a query language for application programing interfaces (APIs). An API facilitates communication between two applications (e.g., software components). The first application, often called the client, sends a request to the second application, often called the server, which responds to the request. Common uses of APIs include facilitating communication between operating systems and applications, between client devices (e.g., mobile devices, computers) and web servers, and between an application and a database.

GraphQL includes a GraphQL query language, GraphQL server, a GraphQL request, and a GraphQL response. The GraphQL query language defines the permissible terms and syntactical grammar rules in which GraphQL operates to obtain data, such as from a data store. A GraphQL server is a component, associated with the client and/or the server, which executes a GraphQL request to obtain a GraphQL response.

The GraphQL query language defines the structure and function of GraphQL requests to be executed by the GraphQL server to retrieve the GraphQL response. A GraphQL request is composed of one or more of: operations, fields, arguments, directives, fragments, and variables. An operation is the action to be performed to retrieve the response, including queries, mutations, and subscriptions.

A query is a request to read data. For example, a query of books and authors returns lists of books and authors. The structure of the query is crucial to what and how the data is returned. For example, a query structured to query books and query authors would return a first list of book titles and a second list of authors. A query structure to query books and authors would return a single list of book titles and associated authors. A subscription is a long-lived request to read data in response to client events.

A mutation is a request to write data. For example, a mutation may define adding a book, which includes two fields, book title and author based on the GraphQL schema defining books titles and authors as fields for the book type. Similar to a query, the structure of the mutation is crucial to what and how the data is entered. A missing field or incorrectly ordered field may allow entry of incorrect information, or render the mutation unable to be entered.

A field describes one discrete piece of information available to be returned based on the operation. A request may contain one or more fields. Some fields describe complex data, including relationships to other data. Thus, in some cases, a field may contain a set of data. The request may then include deeply nested data. Each field, including nested fields, ultimately references a scalar value (e.g., a string of characters or an integer).

A field may accept an argument which alters the behavior of the field, for example, specifying a size of a profile picture to be returned for a user. A fragment allows for the reuse of a repeated section of fields. A variable may be used to parameterize the request, thereby maximizing reuse and minimizing build time.

A type describes the type of data available for fields and variables. In some cases, a type may include one or more other types.

Directives provide additional direction for a request, including lists of arguments, and additional information for types, fields, fragments, and operations.

Initially, for each data set available to a GraphQL server, a GraphQL schema is defined to describe the "shape" of the data available to be retrieved by the GraphQL server. The GraphQL schema is defined in terms of the types and directives available for the data, including a hierarchy of data types and associated fields within the data store. The hierarchy includes the relationships between the fields. For example, a book type may be associated with an author type, and the author type may be associated with a list of book titles. For each type, one or more fields may be defined. For example, the book type may include two fields: book title and author such that each book is associated with a title and author.

GraphQL APIs may be used for a variety of data and client-server systems because GraphQL is not tied to any specific database or storage engine. Instead, as a GraphQL schema is defined for each database or storage engine, GraphQL is adaptable to a variety of data systems. Moreover, responses generated by a GraphQL server are in a format usable by the client and contain the data requested. Thereby, GraphQL enables increased efficiency and flexibility in fetching and entering data through APIs. Thus, GraphQL-based APIs are becoming ubiquitous and there is a need for improved systems and methods of processing GraphQL requests.

SUMMARY

Certain aspects provide a method of validating a GraphQL request, comprising assessing a parsability of the GraphQL request with a parser, wherein the parsability of the GraphQL request indicates an adherence of the GraphQL request to a set of syntactical grammar rules associated with a language of the GraphQL request; verifying an executability of the GraphQL request, wherein the executability of the GraphQL request indicates an operational validity of the GraphQL request; evaluating a hierarchical correctness of the GraphQL request, wherein the hierarchical correctness of the GraphQL request indicates a depth of an error associated with the GraphQL request; and assigning an accuracy metric to the GraphQL request based on the parsability, the executability, and the hierarchical correctness of the GraphQL request, wherein the accuracy metric indicates a comprehensive assessment of the GraphQL request.

Certain aspects described herein provide a method of validating a GraphQL request, comprising: assessing a parsability of the GraphQL request with a parser, wherein the parsability of the GraphQL request indicates an adherence of the GraphQL request to a set of syntactical grammar rules associated with a language of the GraphQL request, comprising: parsing the GraphQL request based on the set of syntactical grammar rules; and assigning a parsability score to the GraphQL request, wherein the parsability score comprises a binary score indicating the GraphQL request is parsable or unparsable; verifying an executability of the GraphQL request, wherein the executability of the GraphQL request indicates an operational validity of the GraphQL request, comprising: validating the GraphQL request against a schema associated with a GraphQL database for execution of the GraphQL request; and executing the GraphQL request in an isolated virtual machine to determine an executability score, wherein the executability score indicates an executability of the GraphQL request against the schema associated with a GraphQL database for execution of the GraphQL request; evaluating a hierarchical correctness of the GraphQL request, wherein the hierarchical correctness of the GraphQL request indicates a depth of an error associated with the GraphQL request, comprising: modelling a hierarchy of the GraphQL request as a request tree, wherein the request tree comprises a set of nodes, each node of the set of nodes representing a token of the GraphQL request; categorizing each node of the set of nodes based on a depth of the node in the request tree, wherein the depth of the node indicates a closeness of the node to a root node in the set of nodes in the request tree; and assigning a hierarchical correctness score for each node of the set of nodes, wherein the hierarchical correctness score indicates an error associated the node and the depth of the error associated with the node; and assigning an accuracy metric to the GraphQL request based on the parsability, the executability, and the hierarchical correctness of the GraphQL request, wherein the accuracy metric indicates a comprehensive assessment of the GraphQL request.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
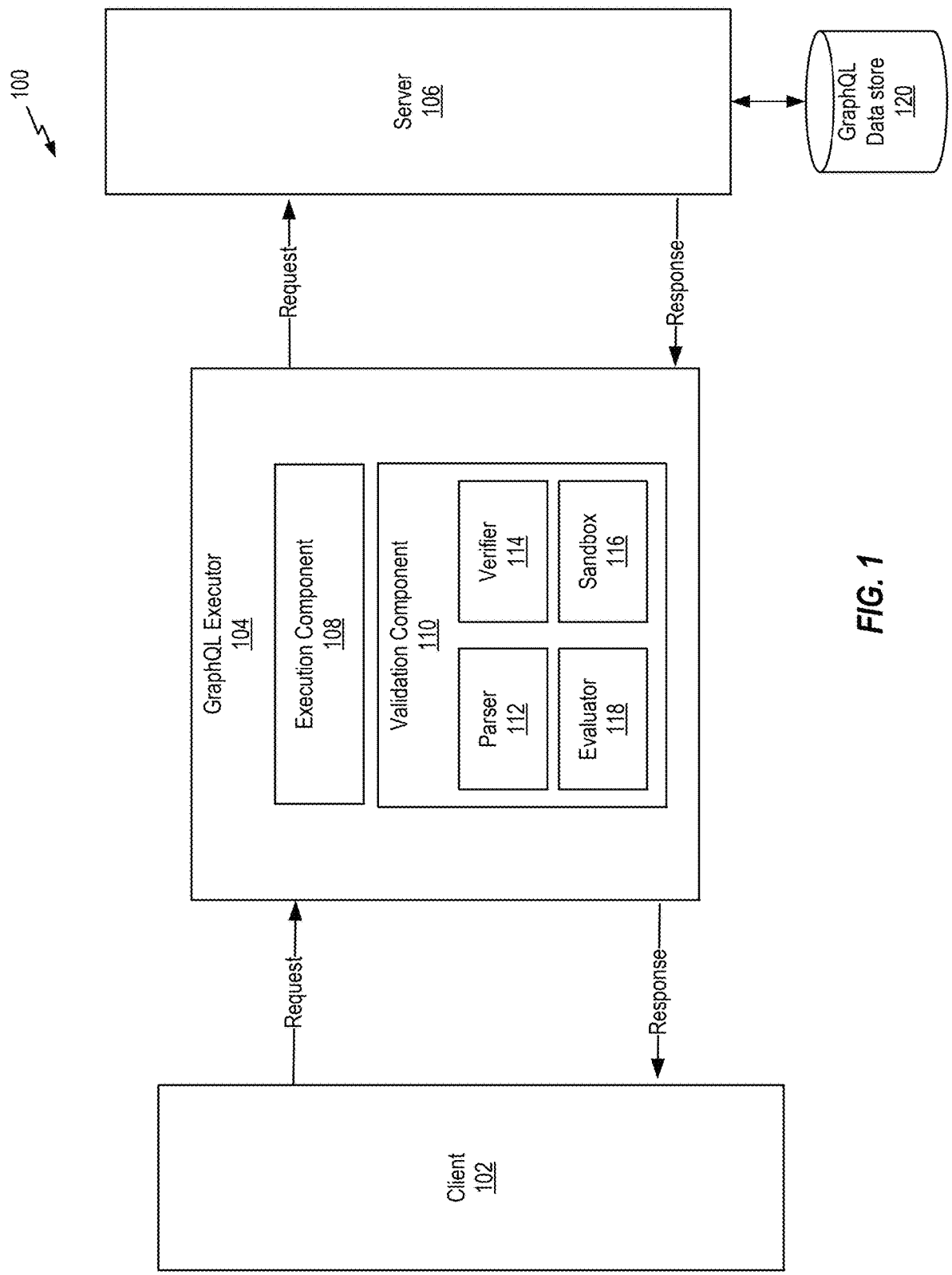
FIG. 1 depicts an example GraphQL API system.

Aspects of the present disclosure provide apparatuses, methods, processing systems, and computer-readable mediums for validating GraphQL requests to facilitate interactions between software components via application programming interfaces (API).

Before a GraphQL request is executed, e.g., processed to retrieve or write data, the request may be validated. Validation ensures that requests will be able to be processed (e.g., they are able to be executed by a GraphQL server) and will return a response. A valid request will return the requested data from the data set in the format specified in the request. For example, a valid query will return a copy of the requested data structured in the format requested by the client. A valid mutation will return a copy of the data written into the data set as specified by the client. In some cases, a GraphQL request may be automatically (e.g., using software tools and/or models) generated, and validation is useful for determining whether the generated request is valid.

Execution of an invalid request may result in a run-time error and render the GraphQL server unable to retrieve or write the requested data. In some cases, execution of an invalid request may return a response, but the response contains errors, for example, fails to return a piece of data, returns an incorrect piece of data, or an unintended piece of data. For example, a response may contain an error instead of a piece of data or the wrong data instead of the intended correct data. Further, attempting to execute an invalid request may waste resources (e.g., processing, memory, and networking resources) and induce latency into a process, and in some cases, may return incorrect data appearing to be correct.

Conventional methods for validating GraphQL requests include text-based comparisons and/or manual review. A text-based comparison may include determining a similarity between the request and a reference request structure. Such validations methods focus on superficial correctness of the content, such as compared to the reference request structure, while overlooking the syntactic accuracy and executable integrity regarding the function of the GraphQL request. For example, a GraphQL request may appear valid because the types and fields requested match the schema, however, it may not be functional because the returned result will be incorrect.

Manual review involves a programmer reviewing the request and comparing the request to the schema to determine whether the request is valid. Many APIs are configured to handle 2,000 or more requests per minute. Practically speaking, manual review would create massive latency issues and render many services, which rely on rapid data responses, inoperable.

In addition to the aforementioned issues, another technical problem with conventional methods is that such methods often fail to account for the context of the defined schema. For example, the text-based comparison may compare to a reference request structure, such as to determine whether the request follows the syntactical grammar rules of GraphQL, but may not determine whether the fields, types, directives, and arguments of a request are functional for the defined schema. For example, a text-based comparison may not compare each field of the request to the defined fields in the schema to determine whether the field exists in the schema, whether the field is ordered correctly in the hierarchy relative to the other fields, and whether the field will return the intended data.

Another technical problem with conventional methods is that validation does not determine the functionality of the request, that is, whether a request can perform the operation on the data according to the defined schema. As an example, a request may include an argument, for example to alter a field, however the argument may not be valid due to a characteristic of the field. For example, a query a request may include an argument to return Luke Skywalker's height in units of meters, rather than units of feet, but if the argument is incorrectly associated with Luke Skywalker's name, the argument cannot be executed on a string (e.g., text) field.

Yet another technical problem with conventional methods is that validation does not determine whether the request will efficiently retrieve data (e.g., in terms of resource consumption to perform the request). A request which is syntactically correct, but functionally inefficient due to over- or under-fetching of data, may nevertheless appear valid.

An over-fetching of data will return more data than expected by the client, which may affect the client's ability to utilize the data for downstream processing because the client may receive data that it does not use and that unnecessary data may be conflated or confused with the data it intended to receive. This may occur when a request includes a fragment, which is a short-cut for a set of fields, but only a subset of the fields in the fragment were desired. The fragment is valid, and a response will be returned, however, this extraneous information was unexpected and did not need to be read. Over-fetching can lead to increased network traffic, longer response times, and unnecessary data processing for the client to process the unnecessary data.

An under-fetching of data will return less data than expected by the client, which may also affect the client's ability to utilize the data for downstream processing because the client may not receive all the data which it intended to receive. This may occur when a request fails to include all the fields containing the desired data, such as by using a fragment. For example, the request may include a fragment to refer to a set of fields, however, the included set of fields is only a subset of the desired data. The fragment is valid, and a response will be returned, however, there is missing information that was expected and desired. A second request may need to be sent to obtain all the data. Under-fetching can result in a client receiving incomplete data, as well as lead to increased latency, network traffic, and unnecessary data processing because repeated or subsequent requests need to be sent to the server to obtain all the data. Thus, both over-fetching and under-fetching can increase network traffic, increase processing times, and cause unnecessary data processing-all technical problems in the existing art.

Aspects of the present disclosure provide for a validation framework that provides improved evaluation and assessment of GraphQL requests, and in particular enables identification of functional and structural errors in invalid GraphQL requests before execution. In aspects, identified invalid GraphQL requests may be refined before execution to reduce processing of invalid GraphQL requests. The validation framework described herein assesses GraphQL requests through a multidimensional approach, including assessing parsability, executability, and hierarchical correctness (each individual dimensions) of GraphQL requests.

Parsability indicates the conformity of the GraphQL request with the syntactical grammar rules of the GraphQL language. The request may be converted to a sequence of tokens. Tokens may be formed by processing the characters of the request from left to right and determining tokens based on sets of characters of the request satisfying a syntactical grammar rule of the GraphQL language. Characters may include text, white spaces, line terminators, numerical text, and punctuation. Each token may be processed in sequence during execution to fulfil the request and generate a response.

The sequences of tokens forming the request may be transformed into an abstract syntax tree (AST) based on the syntactical grammar rules of the GraphQL language. The parsability of a request is determined based on whether the entire request may be broken into its constituent parts and form tokens according to the syntactical grammar rules of the GraphQL language. For example, some mathematical expressions (e.g., %, x,+, etc.) are not used in the GraphQL language and a request containing such a mathematical expressions may not be parsable because it does not conform to the syntactical rules of the GraphQL language. Parsability may be a binary indication, where a request is determined to be parsable or not (e.g., parsability=yes or parsability=no).

Beneficially, the parsability of a request indicates whether the GraphQL request adheres to the requirements of the GraphQL server, as dictated by the syntactical grammar rules. A request which is unparsable cannot be executed. Therefore, in certain aspects, a request which is unparsable will be deemed as invalid and returned to be refined or otherwise amended such that it may be parsable. Beneficially, resources are not wasted attempting to execute the unparsable request.

Executability indicates the ability of the GraphQL request to perform its intended function when executed, that is, return a response comprising the intended data. For example, a query request that is executable will return a response comprising a copy of the requested data. A mutation that is executable will return a response comprising a copy of the written data. A request may be processed for execution if the request contains at least one operation. Because a response may be processed for execution where it is parsable, but may nevertheless generate an ambiguous, surprising, or unexpected response, executability determines whether the request is operationally valid with respect to the defined schema An incorrect request may still be processed, in that it will produce a stable result (e.g., not return an error) when executed, however the result may be ambiguous, surprising, or unexpected relative to a correct request. For example, a mutation request to write a book title and author may mistakenly invert the title and author in the request, e.g., listing "Lucy Maud Montgomery" as title and "Anne of Green Gables" as author. Based on the defined schema, the mutation request may still be executed because each of the title and the author are a string of characters. However, executing the request would not result in the intended data because the response would be listing "Lucy Maud Montgomery" as the title of the book and "Anne of Green Gables" as the author, when the intended data was "Anne of Green Gables" as title and "Lucy Maud Montgomery."

Beneficially, the executability of a request provides a verification of the functionality of the request, by testing the operation of the request against the defined schema. Thus, a request which functions sufficiently to return an intended result may be executed, while a request which, if executed, would not return a sufficient result is not executed, thereby saving processing resources.

In certain aspects, the executability of a request may be assigned a score or value within a range of scores such that different requests are determined more or less likely to return the intended data based on their executability value. For example, a request that is able to be executed by the GraphQL server, but only returns some of the intended data may be determined a lower executability compared to a second request that is able to be executed and returns all of the intended data. Thus, rather than expending resources processing a request which may not return the intended data, such a request may be refined or amended.

Figure 3:
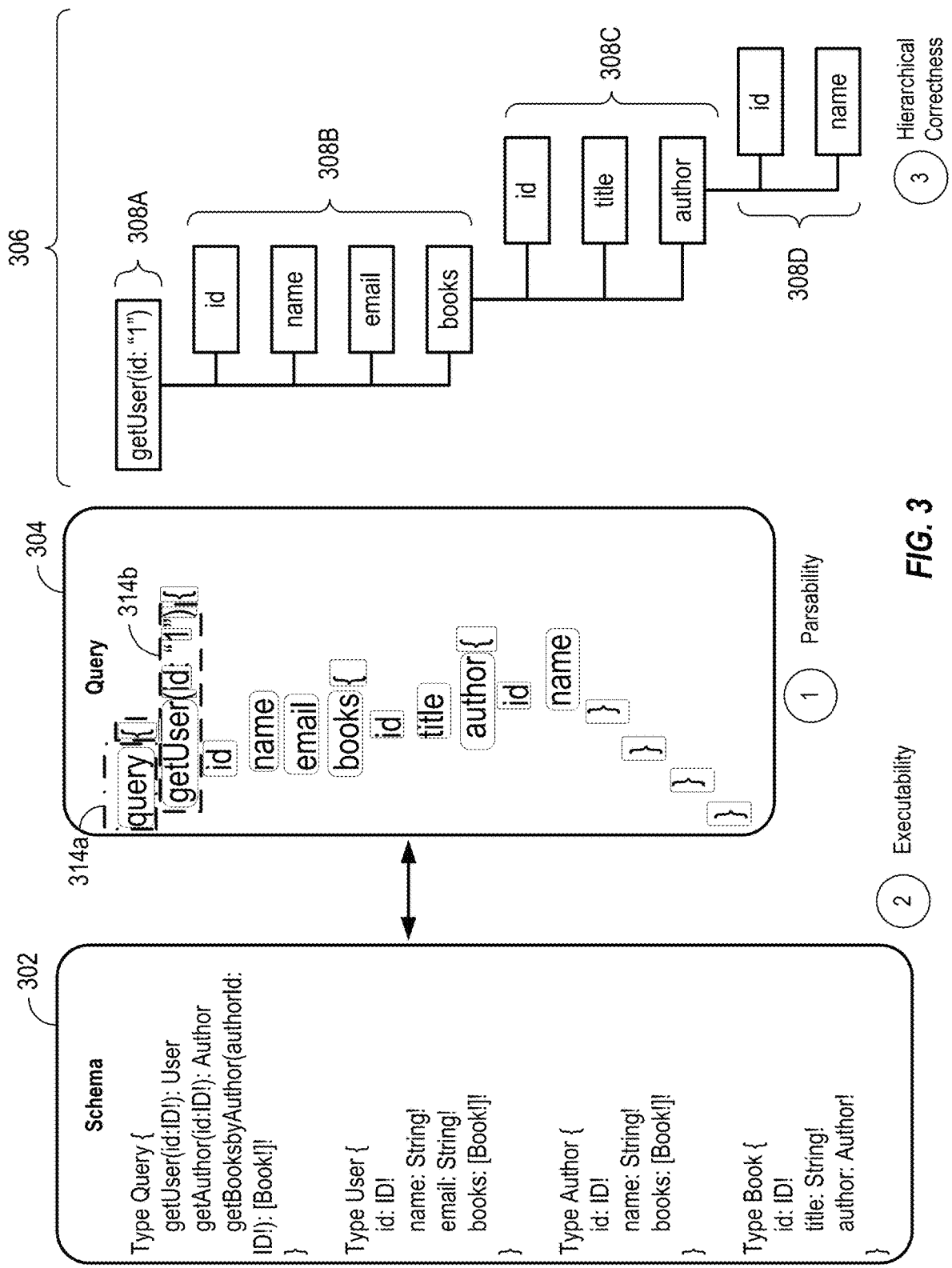
FIG. 3 depicts an example GraphQL schema, query, and hierarchy.

Hierarchical correctness indicates the correctness in the arrangement and relationship of tokens of the request, for example, between operation, fields, arguments, and the like, of the request. As described above, the request is parsed to form the AST, which dictates how the request is processed, starting at the top of a request tree (e.g., at a root node), and processing through each node to the leaf node(s) at the end of the tree. Thus, the hierarchy of a request may be thought of as describing a tree of information, whereby fields of information may be listed within nested fields forming branches. The response is generated based on processing through the tree. A request is ordered such that when executed from top to bottom of the request tree (e.g., left to right and line by line of the written request), the data is retrieved (e.g., read or written) in accordance with the request tree to generate a corresponding response tree of information. Further, arguments, directives and the like, which may alter a field, are functionally tied to their associated field based on the structural location, e.g., on the same node of the request tree, as the associated field. Therefore, the hierarchical structure of the request indicates the hierarchical structure of the response. Moreover, the hierarchical structure of the request should match the hierarchical structure of the data of the schema. An example request tree is depicted in FIG. 3 and described further below.

The hierarchical correctness of a request may be assigned a score or value within a range of scores based on the number and location of errors within the tree. Because an error earlier in the request, e.g., higher in the tree, effects the subsequent tokens, e.g., lower nodes in the tree, even correct lower tokens may nevertheless return unintended data. Thus, such errors higher in the tree may be penalized greater than errors lower in the tree because errors lower in the tree have fewer (if any) subsequent tokens to affect. Moreover, given the relationship between tokens of the request, e.g., represented by nodes of the tree, the relationship of an error upon the surrounding nodes is captured by the penalty based on the depth of the node. Thus, a request with fewer and/or less impactful errors may be indicated as more hierarchically correct, e.g., having a higher hierarchical correctness score.

Thus, in certain aspects, the parsability, executability, and hierarchical correctness may be determined in order to assess the validity of a request prior to executing the request, which represents an improvement to the state of the art. Requests which are not validated, for example, where the parsability, executability, and hierarchical correctness are not satisfactory, may not be executed by the GraphQL server, thus saving resources and reducing network traffic and latency. Further, invalid requests may be refined or amended to fix such errors prior to execution. Accordingly, aspects of the present disclosure provide for a comprehensive validation framework that reduces resource consumption by identifying invalid requests, avoiding execution of invalid requests, and in some cases remediating the invalid request so that it can be executed.

Example GraphQL API System

FIG. 1 depicts an example GraphQL API system 100 configured to facilitate communications between software components, such as applications, microservices, components, data repositories, and the like.

In this example, a client 102 is a first software component sending a request to a second software component, a server 106, to retrieve a response from the server 106. The client 102 and the server 106 may each be examples of a variety of software components. Common examples of API systems, e.g., API system 100, include a web service API to facilitate communication between a web server and a web browser, a private API between components of an application, such as microservices, a partner API between components of two different applications or services, and the like.

The client 102 and the server 106 communicate through an API executor, in this example, GraphQL executor 104. In a web services example, the GraphQL executor 104 may receive a query from the client 102, such as a mobile device, to communicate with the server 106, such as a social network, to obtain social media on the mobile device. Although depicted in this example separately from the client 102 and the server 106 for simplicity, the GraphQL executor 104 may form part of the client 102 and/or the server 106. For example, the client 102 may comprise an API component configured to generate, execute, send, and/or receive API requests. As another example, the server 106 may comprise an API component configured to generate, execute, send, and/or receive API requests.

Initially, a GraphQL schema is defined to describe the data accessible by the server 106, here, the data stored in data store 120. In some examples, the server 106 may be configured to access data stored in multiple data stores, or interact with one or more additional components to obtain data. The schema defines the characteristics, called the "shape" of the data stored in data store 120, which may be represented as a tree of data. This tree of data should match the AST tree of a request, and be used to generate a response tree when the AST is executed by an execution component 108. The schema is defined in terms of the types (e.g., types of data) directives, and operations it supports. For example, a piece of data may be defined as a scalar value, such as a string or an integer. Each scalar value may be represented by a leaf in the tree of data. Each piece of data may be associated with a field. Each field may be associated with a type or another field. A type may be associated with one or more fields. Thus, the associations between each field, other fields, and types may be used to form a hierarchical tree representing all the data, and define the schema.

As a simple example, the data store 120 may comprise a data store of books and associated information. The schema may define "book" as an object type and include a field comprising a scalar value (e.g., string) of the book title, and a type comprising an author. The author type includes a field comprising a scalar value (e.g., string) of the author's name and a type comprising the book. In other words, each book may be associated with a title and author and each author may be associated with a name, and one or more books. An example book schema:

```
type Book {
  title: String!
  author: Author
}
type Author {
  name: String!
  books: [Book]
}
```

The GraphQL executor 104 is configured to receive, validate, and execute a request to obtain the data from the server 106 to form the response to the client 102. The GraphQL executor 104 comprises an execution component 108 and a validation component 110. The execution component 108 is configured to execute a valid GraphQL request and generate the response based on the data of server 106, such as stored in the data store 120.

In this example, a GraphQL request comprises a query requesting data from the server 106. The GraphQL request may also comprise a subscription that repeatedly requests data from the server 106 based on an action of the client 102.

An example request may be a query to read data, such as to read data for book titles and authors for schema defined above:

```
query GetBooksAndAuthors {
  books {
    title
  }
  authors {
    name
  }
}
```

A GraphQL request may also comprise a mutation modifying data stored at the server 106. For example, a mutation may add a book using two tokens, book title and author, based on the schema defining titles and authors as fields for the book type. An example mutation for adding a mutation for the schema defined above:

```
mutation CreateBook {
  addBook(title: "Little Women", author: "Louisa May Alcott") {
    title
    author {
      name
    }
  }
}
```

The validation component 110 is configured to validate the GraphQL request before it is executed by the execution component 108. As described above, passing an invalid request to the execution component 108 may result in a run-time error, such that the execution component 108 is unable to execute the request, or an incorrect response is returned in response to the request. Thus, resource waste may be reduced by determining a request is invalid before execution by execution component 108.

The validation component 110 comprises a parser 112, a verifier 114, an evaluator 118, and a sandbox environment 116.

The parser 112 is configured to parse the request to determine whether the request adheres to the set of syntactical grammar rules associated with a language of the GraphQL request. The parser 112 enables substantiation of the structural validity of the request. Because GraphQL is a language, a GraphQL request is valid where the tokens, characters, operators, and tokens of the request comply with the syntactical grammar rules of the GraphQL language. For example, the GraphQL language utilizes lexical tokens and grammar to encode content within a request, however, because the GraphQL language is a data description language and not a programming language, GraphQL lacks the punctuation often used to describe mathematical expressions. Thus, a GraphQL request containing punctuation for a mathematical expression will not be determined to be valid by the parser 112. Other GraphQL syntactical grammar rules regard the spelling, capitalization, and punctuation used in GraphQL language. GraphQL syntactical grammar rules further regard the term and line spacing, and order of tokens of the language. Further, GraphQL syntactical grammar rules define the operations for execution and the types of data to be executed on.

The verifier 114 is configured to verify the executability of the GraphQL request. The verifier 114 determines whether the request, if executed, will operate as intended on the data. For example, a query intended to obtain book titles and authors, but actually obtains a book international standard book number (ISBN) and author, may adhere to the syntactical grammar rules of GraphQL, as determined by the parser 112, but will not operate as intended because it will return ISBN, not book title. The verifier 114 is further configured to utilize the defined schema for the data store 120, thus, it will verify the executability of the GraphQL request for that data. Beneficially, then, a request is executable where the request will operate as intended.

In some aspects, the verifier 114 is configured to utilize a sandbox environment 116 to test the functional effectiveness of the request in a controlled environment. A sandbox environment is a testing environment that isolates untested software changes and enables experimentation isolated from the production environment. A sandbox may be an isolated virtual machine (VM). A VM is a virtual representation or emulation of a physical computer. A sandbox environment replicates at least the minimal functionality needed to test the request, including, for example, environmental variables such as access to a data set, the defined schema, and the like in the VM. A sandbox environment protects the production (e.g., live) environment, for example, from faulty software, or, in this case, an invalid request, by allowing for testing the functional effectiveness of the request in the VM without interfering with the data store 120 and the live network. Testing execution of the request in the sandbox environment 116 indicates the functional effectiveness of the request by executing the request and determining whether the output represents the intended response. Thus, a higher executability may indicate the output in the sandbox environment 116 was operationally correct and generated an intended result. A lower executability, however, may indicate the output in the sandbox environment 116 was less correct, for example, by returning an error associated with one or more tokens, failed to produce a results, and the like. For example, a higher executability query for book titles and authors for schema defined above:

```
"""
{
  books {
    title
    author {
      name
    }
  }
}
"""
```

Meanwhile, a lower executability query for book titles and authors for schema defined above:

```
"""
{
  books {
    title,
    author {
      name
    )
  }
}
"""
```

The evaluator 118 is configured to evaluate the hierarchical correctness of a GraphQL request. Because a GraphQL request is structured in a hierarchical manner, e.g., formatted as a tree, and executes in a hierarchical manner, e.g., generates a response tree, errors in a higher node may have a cascading impact. Thus, an error in a high node of the request (e.g., earlier in the request) may be propagated throughout other nodes of the request, reducing the request's functionality. Further, an error in a lower node, such as a leaf node may not have a similar cascading effect. Leaf nodes, however, often contain important information because they contain scalar values, e.g. content, and thus an error in a leaf node may result in a parsable request (e.g., as determined by the parser 112), but nevertheless render an incorrect result. For example, an error in a query for a book title instead of an ISBN, may be parsable, and executed to obtain information about the book, but would return the title, rather than the ISBN. This error, however, may not be propagated because it does not have any lower nodes to affect. However, an error in a query for a book titles and ISBNs written by "John Steinbeck", for example, referring instead to "John Grisham," would affect the results of both book titles and ISBN. Thus, errors at higher levels may affect more subsequent nodes.

The evaluator 118 is configured to determine the hierarchical correctness based on the number and location of errors, to account for such impact of errors in higher nodes on lower nodes. Higher penalties (e.g., a lower hierarchical correctness score), may be assigned to errors with a greater impact. Thereby, a request with fewer and/or less impactful errors may be indicated as more hierarchically correct.

The validation component 110 is configured to use the parsability determined by the parser 112, the executability determined by the verifier 114, and the hierarchical correctness determined by the evaluator 118 to determine the validity of the request. In some aspects, the validation component 110 is configured to assign an accuracy metric to the request based on the parsability, the executability, and the hierarchical correctness. The accuracy metric is based on the combination of the parsability, the executability, and the hierarchical correctness. Thus, the accuracy metric indicates a multidimensional assessment of the validity of the GraphQL request based on its structural and functional correctness.

In some aspects, the request may then be executed by the execution component 108, based on the accuracy metric, to obtain the response from the server 106. In some aspects, the request is executed based on the accuracy metric satisfying an accuracy threshold. For example, an accuracy metric may satisfy the accuracy threshold where the accuracy metric is above the accuracy threshold, such as where the accuracy threshold indicates a level of accuracy required for execution of the request (e.g., a minimum).

Beneficially, the accuracy metric indicates the functional correctness and the structural correctness of the query and provides a multifaceted validation metric for the request. Requests with an accuracy metric that satisfies a threshold may be deemed valid and then executed. Thus, those requests with functional and structural correctness, for the defined schema, may be executed.

The execution component 108 is configured to interface with the server 106 to obtain the results to the request based on the data store 120 and return the response to the client 102. For example, where the previous example query, e.g., for book titles and authors, is executed by the execution component 108, the response may be:

```
{
    "data": {
        "books": [
            {
                "title": "Anne of Green Gables",
                "author": {
```

-continued

```
                "name": "Lucy Maud Montgomery"
            }
        },
        ...
        }
    }
}
```

In some aspects, where the request does not satisfy the accuracy threshold, the request may be refined, for example, to correct an error in the request. For example, an error in the request determined by the parser 112 may be corrected by adjusting the portion of the request with the error. As another example, an error in the request determined by the verifier 114 may be corrected by adjusting the portion of the request with the error. As yet another example, an error in the request determined by the evaluator 118 may be corrected by adjusting the portion of the request with the error. In some aspects, one or more errors determined by the parser 112, the verifier 114, and/or the evaluator 118 may be corrected in the request.

In some aspects, where the client 102 generated the request, the client 102 may refine the request. Thus, beneficially, those requests which do not satisfy the accuracy threshold, may not be executed. Furthermore, those requests which do not satisfy the accuracy threshold may be beneficially refined before execution.

Note that FIG. 1 is just one example of a GraphQL system consistent with aspects described herein, and other GraphQL systems having additional, alternative, or fewer components are possible consistent with this disclosure.

Example Process Flow for Validating GraphQL Requests

Figure 2:
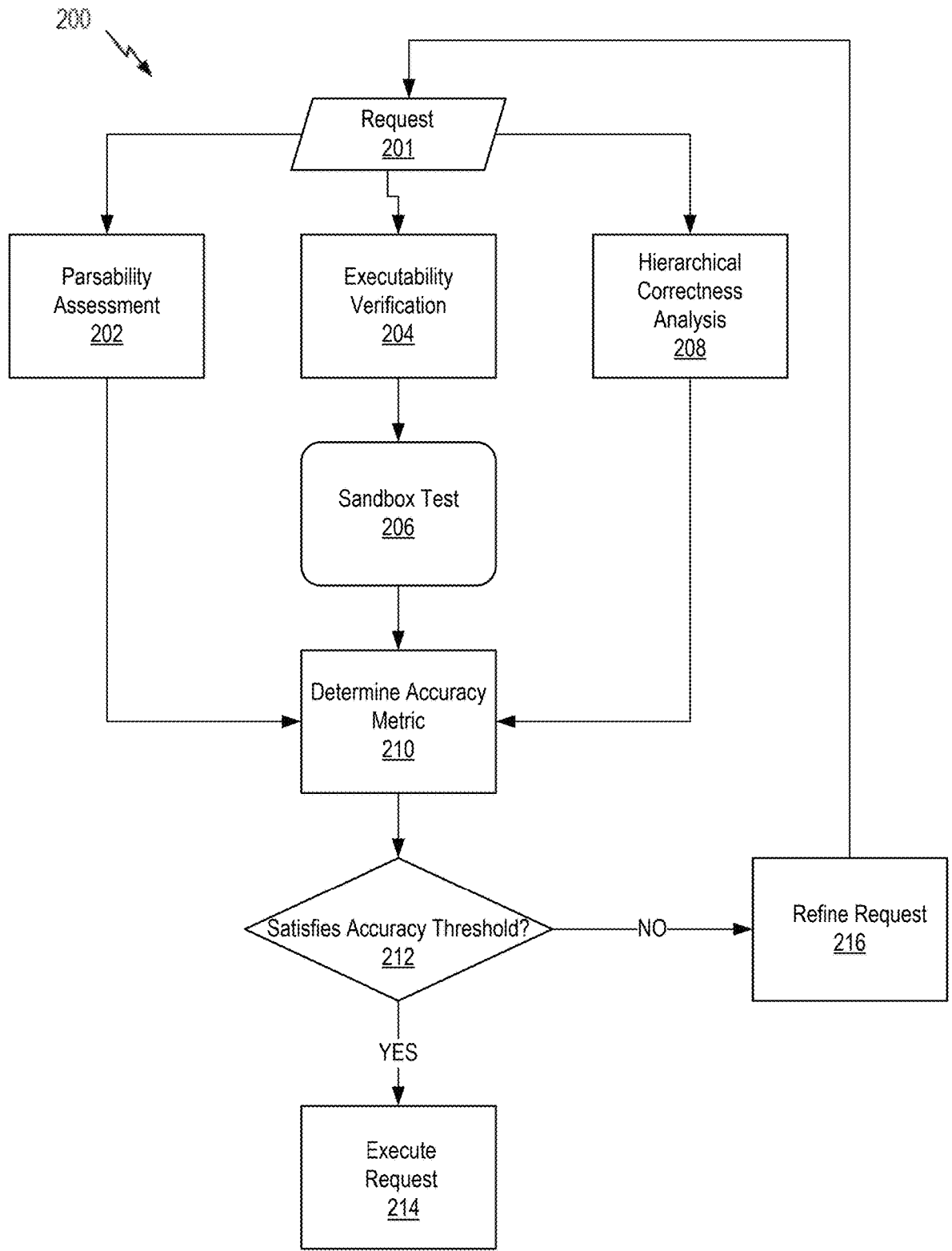
FIG. 2 depicts an example process flow for validating GraphQL API requests.

FIG. 2 depicts an example process flow 200 for executing a GraphQL request, for example, with GraphQL executor 104 described in FIG. 1.

Initially, at step 201, a request is received from a client, for example, client 102 in FIG. 1. The request comprises an API request, for example, a GraphQL request. In some aspects, the request comprises a query or subscription for data from a server, for example, server 106 in FIG. 1, including data stored in data store 120. In some aspects, the request may be a mutation requesting an update to data stored on the server, for example, an update to data stored in data store 120. FIG. 3 depicts an example query 304 that requests user information, including user ID, name, email, and book information, including book ID, and title, as well as author information including author ID and author name.

At step 202, the parsability of the request is assessed. The parsability of the request may be assessed by a parser, for example, parser 112 in FIG. 1. The parsability of the request indicates whether the request adheres to a set of syntactical grammar rules of GraphQL language. As described herein, the GraphQL language has syntactical grammar rules regarding the structure of GraphQL request, including the permissible characters, punctuation, white spaces, and the like, as well as the permissible tokens, such as operations, fields, arguments, directives, fragments, and variables that may be used by a GraphQL server to return a response. The parser is configured to analyze the request by breaking it into its constituent parts, e.g., tokens, in a process often called lexing or a lexical analysis, based on the syntactical grammar rules. In one example, white spaces and tabs are ignored tokens and are thus skipped during parsing. Next, the lexical tokens are analyzed and grouped based on the syntactical grammar rules of the GraphQL language, wherein each group represents a rule or step for execution. During execution, each group is executed in order to generate the response.

In some aspects, the parser is further configured to assign a parsability score, P, reflecting the request's adherence to the set of syntactical grammar rules. In some aspects, the parsability score may be a binary score, for example, where 0 indicates the request is unparsable and 1 indicates the request is parsable.

In the example query 304 depicted in FIG. 3, the query is lexically analyzed to identify its constituent parts, e.g., tokens, depicted in FIG. 3 as rounded boxes around each token of the query. In the depicted example, both identifiers (e.g., types, fields, etc.), and punctuation (e.g., {,},etc.) are determined to be part of token(s). Further, the tokens are grouped into rule sets, depicted in FIG. 3 as first rule 314a depicted in dashed and dotted line, and second rule 314b depicted in a dashed line. If the entire query 304 is parsable, then the parsability score (P) may be 1. If the entire query 304 is not parsable, e.g., not every part may be tokenized and/or grouped into a rule set, then the parsability score may be 0.

Returning to FIG. 2, at step 204, the executability of the request is verified. The executability of the request may be verified by a verification component, for example, verifier 114 in FIG. 1. The executability of the request indicates whether the request will perform its intended function within the context of the schema. In some aspects, the executability of the request is based on verifying the request against the defined schema.

For the example query 304 depicted in FIG. 3, the query may be executed against a defined schema 302. In this example, each type and associated fields are defined in the schema 302, and thus the query 304 may be executable. For example, the type userid is associated with fields id, name, email, and type book. Type book is associated with fields id, title, and author type. Type author is associated with is, name, and type book, as depicted in schema 302. Because the query 304 includes the type userid and associated id, name, email, and books, which matches the type user id of the schema 302, this portion of the query 304 would be execute as intended. The query 304 also includes the book type, and associated id, title, and author, this portion of the query 304 would also execute as intended. The query 304 further includes the author type, and associated id and name, with portion of the query 304 would also execute as intended.

Returning to FIG. 2, at step 206, the request is executed in a sandbox environment to verify the functional effectiveness of the request in the controlled environment. In the sandbox environment, the request is executed using a replication of the data set and defined schema, but on an isolated VM to separate the request from the network.

In some aspects, the request is assigned an executability score, E, reflecting the execution of the request in the sandbox environment. In some aspects, the executability score may be on based on a range, for example, between 0 and 1, wherein 0 indicates the request was not executable and 1 indicates perfect executability within the sandbox, that is, only the intended data and no errors are returned. For example, a request which, when executed in the sandbox environment, returns the requested data may be assigned an executability score of 1. As another example, a request, which, when executed in the sandbox environment, returns a list of one or more errors may be assigned a lower score, e.g., closer to 0. A sandbox environment protects the production (e.g., live) environment, for example, from faulty software, or, in this case, an invalid request, by allowing for testing the functional effectiveness of the request without interfering with the data store 120.

At step 208, the hierarchical correctness of the request is evaluated. The hierarchical correctness of the request may be evaluated by an evaluation component, for example, the evaluator 118 in FIG. 1. The hierarchical correctness of the request may indicate a depth of an error of the request in a request tree generated based on the query, e.g., query 304.

In some aspects, the evaluator may assign a hierarchical correctness score, H based on a number of errors, and/or a location of the error(s) in the request. In some aspects, the correctness of one or more leaf nodes of the request, that is, the terminal type and associated attributes of the request, may be associated with a higher hierarchical correctness score.

Because an error higher in the hierarchy of the request will have a cascading impact on the rest of the request, such an error may result in an incorrect result. In some aspects, the hierarchical correctness score comprises a weighted parameter, in which an error in a higher node in the hierarchy of the request, e.g., closer to a root node, incurs a higher weighted penalty. For example, an error in a root node will have a greater penalty compared to an error in a leaf node.

In some aspects, the hierarchical correctness score may be determined based on the request tree built based on the syntactical grammar rules defining the root node, and subsequent nodes defined in the request. For example, each rule of the set of rules parsed at step 202, is a node of the tree, and there may be branches based on the types and fields of the request. The operator of the request forms a root node, e.g., query, subscription, or mutation, and each lexical token represents a subsequent node, until the scalar value(s) of the request form the leaf node(s).

The hierarchical correctness score may be determined by categorizing each node of the request based on the depth of the node in the request tree, for example, a root node or a leaf node. Then, the hierarchical correctness score may be determined by assigning a score to each node of the request based on the depth of the node within the request. A node closer to the root of the request is given a higher score (e.g., penalty), because an error higher in the request will have a cascading impact on the request's structure and ultimate execution. Additionally, in some aspects, a logarithmic scaling may be applied to the score of each node. The scaling may moderate the severity of the scores of lower nodes (e.g., increased depth and further from a root node) because an error in a lower node may have a reduced effect on the execution of the request, such as compared to higher errors.

In some aspects, the hierarchical correctness of the request may not be determined based on request and/or variable names. For example, a query name and/or a variable name, which may be arbitrary identifiers defined in the schema, may not indicate the structure or function of the request. Such identifiers may be skipped during evaluation of the hierarchical correctness to focus the hierarchical correctness based on the structure of the request.

In some aspects, the hierarchical correctness score of the request is normalized to a 0 to 1 scale, where a hierarchical correctness score closer to 1 contains fewer errors, while a hierarchical correctness score closer to 0 contains more errors.

In one example, the hierarchical correctness score may be determined as follows:

$$H = \frac{\sum_{i=1}^{N} w(d_i) \cdot C_i}{\sum_{i=1}^{N} w(d_i)} \quad (1)$$

Where H is the hierarchical correctness score, and $C_i$ is the correctness of node, i. $w(d_i)$ is the weight based on the depth, $d_i$, of the node, i. The $w(d_i)$ is set by a piecewise weight function:

$$w(d_i) = \begin{cases} M & \text{if } d_i = 1 \\ \frac{1}{\log_2(d_i)} & \text{if } d_i > 1 \end{cases} \quad (2)$$

For the root node, e.g., $d_i=1$, the weight function $w(d_i)$ is set to an arbitrarily large number M to prevent divisions by zero and assigns a high penalty to an error at the root node. For node that are not the root node, e.g., $d_i>1$, the weight function $w(d_i)$ implements a logarithmic reduction to such nodes because the node is deeper in the hierarchy of the request.

FIG. 3 depicts example query 304 also shown in a request tree 306 (e.g., AST). Each node of the query 304 is categorized based on the depth of the node in the request tree 306 starting at a root node and descending the tree to one or more leaf nodes, in this example, a root node 308A, a second set of nodes 308B, a third set of nodes 308C, a fourth set of nodes 308D. The root node 308A of the request tree 306 comprises the first type, and its associated set of fields, depicted as the second set of nodes 308B. The root node 308A is at a first depth, e.g., the first node or the root node, where $d_i=1$. The second set of nodes 308B is at a second depth, where $d_i=2$, e.g., one level deeper than the root node 308A. The set of fields also includes a type, books which is associated with a set of fields. This set of fields associated with books is depicted as a third set of nodes 308C. The third set of nodes 308C is at a third depth, where $d_i=3$, e.g., two levels deeper than the root node 308A. This set of fields also includes a type, author, which is associated with a set of fields. This set of fields associated with author is depicted as a fourth set of nodes 308D. The fourth set of nodes 308D is at a fourth depth, where $d_i=4$, e.g., three levels deeper than the root node 308A. In this example, the fourth set of nodes 308D are leaf nodes.

Returning to FIG. 2, at step 210, an accuracy metric for the request is determined. The accuracy metric indicates a comprehensive assessment of the validity of the GraphQL request. In some aspects, the accuracy metric is based on the parsability score, the executability score, and the hierarchical correctness score of the request. In one example, the accuracy metric may be determined based on the parsability score, the executability score, and the hierarchical correctness score of the request as follows:

$$O = \alpha \cdot P + \beta \cdot E + \gamma \cdot H \quad (3)$$

Where, $\alpha$, $\beta$, and $\gamma$, are coefficients determining the weighting of the parsability score, P, the executability score, E, and the hierarchical correctness score, H, respectfully, of the request on the accuracy metric. Initially, each coefficient is calibrated to baseline values based on comparision to a golden data set whereby the accuracy metric may align with a baseline quality for GraphQL request validation. For example, the coeficients may be tuned using hyperparameter optimization to yield an optimal model to minimize a predefined loss function on a reference data set.

In some aspects, one or more of the coefficients may be adjusted to account for conext of the request. For example, in some cases, parsability, executability, and/or hierarchical correctness may be emphasized for determining validity of a request and the respective coefficient(s) may be adjusted to increased the impact of the parsability score, the executability score, and/or the hierarchical correctness score on the accuracy metric. In some aspects, a context of the validation component may indicate an adjustment to one or more coefficients, for example, a context of a client and server communicating through the GraphQL API. For example, a server with a complex schema defined for the data may indicate an adjustment to increase emphasis on the executability score, such as by increasing the coefficient associated with the executability score. As another example, compatability of the validation component with a variety of client and servers may be increased based on an adjustment to increase emphasis on the parsability score, such as by increasing the coefficient associated with the parsability score.

At step 212, it is determined whether the accuracy metric satisfies an accuracy threshold. For example, an accuracy metric may satisfy the accuracy threshold where the accuracy metric is above the accuracy threshold, such as where the accuracy threshold indicates a level of validity for execution (e.g., a minimum). In some aspects the accuracy threshold may be configured based on the scale of tolerable error of a request. The accuracy threshold may be configured based on one or more characteristics of the use case, for example, based on a characteristic of the client (e.g., client 102 in FIG. 1) and/or the server (e.g., server 106 in FIG. 1). In some aspects, the accuracy threshold may be a numerical value. In some aspects, the accuracy threshold may define on a range of numerical values, for example, a range of acceptable scores for the accuracy metric. For example, the accuracy metric may satisfy the accuracy threshold range where the accuracy metric is within the accuracy threshold range.

If, at step 212, the accuracy metric satisfies the accuracy threshold, then at step 216 the request is executed. For example, in FIG. 3, the query 304 is executed on the defined schema 302 to generate a result. The result will be a data in a corresponding shape to the query. If no errors occur, then an errors field will be null, and if an error occurred, then the errors field will include a non-empty array of the error(s).

If, at step 212 of FIG. 2, the accuracy metric does not satisfy the accuracy threshold, then at step 214 the request is refined. For example, an error in the request may be refined by correcting the error in the request. In some aspects, where the request was autonomously generated, for example, by the client, an indication may be sent to the client regarding the error. In some aspects, a refined request may be processed at step 201 to be validated.

Beneficially, the accuracy metric indicates the functional correctness and the hierarchical correctness of the request and provides a multidimensional validation metric for the request. Requests with an accuracy metric that satisfies a threshold may be deemed valid and executed. Thus, those requests with functional and hierarchical correctness, for the defined schema, may be executed, while those without, may not be. Furthermore, those requests which do not satisfy the accuracy threshold may be beneficially refined before execution.

Note that FIG. 2 is just one example of a process flow, and other flows including fewer, additional, or alternative operations are possible consistent with this disclosure.

Example Method for Validating a GraphQL Request

Figure 4:
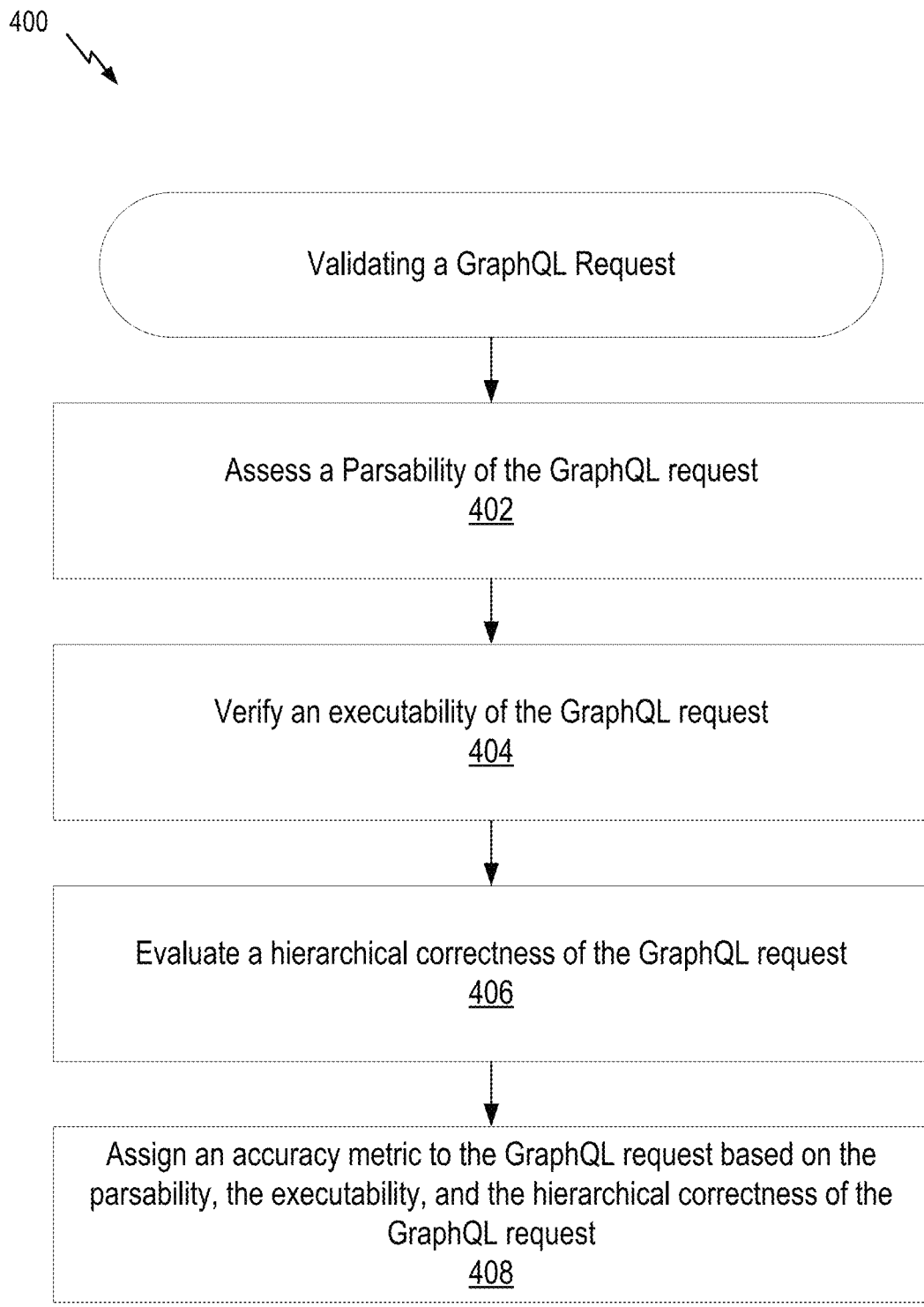
FIG. 4 depicts an example method for validating GraphQL API requests.

FIG. 4 depicts an example method 400 for validating a request, such as a GraphQL request. In one aspect, method 400 can be implemented by the GraphQL API system 100 of FIG. 1 and/or processing system 500 of FIG. 5. In some aspects, the request may comprise a query. In some aspects, the request may comprise a mutation. In some aspects, the request may comprise a subscription.

Initially, at step 402, method 400 begins with assessing a parsability of the GraphQL request with a parser, wherein the parsability of the GraphQL request indicates an adherence of the GraphQL request to a set of syntactical grammar rules associated with a language of the GraphQL request such as described with respect to step 202 of FIG. 2 and depicted in FIG. 3.

In some aspects, assessing the parsability of the GraphQL request with the parser, comprises: parsing the GraphQL request based on the set of syntactical grammar rules, for example, as rules 314a and 314b depicted in FIG. 3; and assigning a parsability score to the GraphQL request. In some aspects, the parsability score comprises a binary score indicating the GraphQL request is parsable or unparsable, such as described with respect to step 202 of FIG. 2 and depicted in FIG. 3. Beneficially, the parsability of a request indicates whether the GraphQL request adheres to the requirements of the GraphQL server, as dictated by the syntactical grammar rules. Thus, a technical benefit is achieved because resources are not wasted attempting to execute the unparsable request.

Method 400 proceeds to step 404 with verifying an executability of the GraphQL request, wherein the executability of the GraphQL request indicates an operational validity of the GraphQL request, such as described with respect to step 202 of FIG. 2 and depicted in FIG. 3.

In some aspects, verifying the executability of the GraphQL request, comprises: validating the GraphQL request against a schema associated with a GraphQL database for execution of the GraphQL request; and executing the GraphQL request in an isolated VM to determine an executability score. In some aspects, the executability score indicates an executability of the GraphQL request against the schema associated with the GraphQL database, such as described with respect to step 204 of FIG. 2 and depicted in FIG. 3. Beneficially, executability assesses the functionality of the request, by testing the operation of the request against the defined schema. Further, executability overcomes the short-comings of conventional text-matching methods by assessing executability against the specifically defined schema, for example, schema 302 in FIG. 3.

In some aspects, the schema comprises at least one of one or more types and one or more associated fields, and one or more operators associated with the GraphQL database.

Method 400 then proceeds to step 406 with evaluating a hierarchical correctness of the GraphQL request, wherein the hierarchical correctness of the GraphQL request indicates a depth of an error associated with the GraphQL request, such as described with respect to step 208 of FIG. 2 and depicted in FIG. 3.

In some aspects, evaluating the hierarchical correctness of the GraphQL request, comprises: modelling a hierarchy of the GraphQL request as a request tree, such as depicted in the request tree 306 of FIG. 3, wherein the request tree comprises a set of nodes, each node of the set of nodes representing a token of the GraphQL request; categorizing each node of the set of nodes based on a depth of the node in the request tree, wherein the depth of the node indicates a closeness of the node to a root node in the set of nodes in the request tree; and assigning a hierarchical correctness score for each node of the set of nodes, wherein the hierarchical correctness score indicates an error associated the node and the depth of the error associated with the node. In some aspects, the hierarchical correctness score is determined based on equation 1.

For example, as depicted in FIG. 3, the request tree 306 models the query 304, including a root node 308A, a second set of nodes 308B at a first depth, a third set of nodes 308C as a second depth, and a fourth set of nodes depicted at a third depth. An error higher in the request tree 306, for example, an error at the first depth in the second set of nodes 308 may affect lower nodes, for example, the third set of nodes 308C and the fourth set of nodes 308D. An error lower in the request tree 306, for example, at the third depth in the fourth set of nodes 308D, will only affect that node. Thus, hierarchical correctness prioritizes correctness in the higher nodes of the request tree 306.

Returning to method 400, in some aspects, the hierarchical correctness score comprises a penalty associated with the depth of the error associated with the node, and the penalty is higher where the depth indicates the node is closer to the root node in the set of nodes in the request tree than to a leaf node in the set of nodes in the request tree, or the penalty is lower where the depth indicates the node is closer to the leaf node in the set of nodes than to the root node in the set of nodes in the request tree. For example, as depicted in FIG. 3 a node in the second set of nodes 308B is closer to the root node 308A than a node in the third set of nodes 308C, and may incur a higher penalty. In some aspects, the penalty may be determined based on equation 2.

Method 400 then proceeds to step 408 with assigning an accuracy metric to the GraphQL request based on the parsability, the executability, and the hierarchical correctness of the GraphQL request, wherein the accuracy metric indicates a comprehensive assessment of the GraphQL request, such as described with respect to step 210 of FIG. 2. In some aspects, the accuracy metric may be determined based on equation 3.

In some aspects, assigning the accuracy metric to the GraphQL request based on the parsability, the executability, and the hierarchical correctness of the GraphQL request, comprises adjusting a weighting of the parsability to impart increased reliance on the adherence to the set of syntactical grammar rules associated with a language of the GraphQL request. For example, in some aspects, the weighting of the parsability may be an a coefficient associated with the parsability score P, of equation 3.

In some aspects, assigning the accuracy metric to the GraphQL request based on the parsability, the executability, and the hierarchical correctness of the GraphQL request, comprises a weighting of the executability to impart increased reliance on the operational validity of the GraphQL request. For example, in some aspects, the weighting of the executability may be a β coefficient associated with the executability score E of equation 3.

In some aspects, assigning the accuracy metric to the GraphQL request based on the parsability, the executability, and the hierarchical correctness of the GraphQL request, comprises a weighting of the hierarchical correctness to impart increased reliance on the depth of the error associated with the GraphQL request. For example, in some aspects, the weighting of the hierarchical correctness may be a γ coefficient associated with the hierarchical correctness score H of equation 3.

In some aspects, method 400 further comprises executing the GraphQL request based on the accuracy metric satisfying an accuracy threshold, such as described with respect to step 216 of FIG. 2.

Thus, requests which may otherwise appear valid, but return incorrect data may not be executed, saving resources and reducing network traffic and latency based on not satisfying the accuracy threshold.

In some aspects, method 400 further comprises refining the GraphQL request based on the accuracy metric not satisfying an accuracy threshold, such as described with respect to step 214 of FIG. 2.

Beneficially, the accuracy metric indicates the functional correctness and the hierarchical correctness of the request and provides a multifaceted validation metric for the request. Moreover, the accuracy metric may be adjusted to impart increased reliance on parsability, executability, and/or hierarchical correctness based on the context of the request and/or the schema. Thus, the validation system is adaptable to specific schema and data to be queried.

Further, requests with an accuracy metric that satisfies a threshold may be deemed valid and executed, while those which do not will not be executed. Furthermore, those requests which are not validated, e.g., fail to satisfy the threshold may be beneficially refined before execution.

Thus, in certain aspects, the parsability, executability, and hierarchical correctness may be determined in order to assess the validity of a request prior to executing the request, which represents an improvement to the state of the art. Requests which are not validated, for example, where the parsability, executability, and hierarchical correctness are not satisfactory, may not be executed by the GraphQL server, thus saving resources and reducing network traffic and latency. Accordingly, aspects of the present disclosure provide for a comprehensive validation framework that reduces resource consumption by identifying invalid requests, avoiding execution of invalid requests, and in some cases remediating the invalid request so that it can be executed.

Note that FIG. 4 is just one example of a method, and other methods including fewer, additional, or alternative operations are possible consistent with this disclosure.

Example Processing System for Validating a Request

Figure 5:
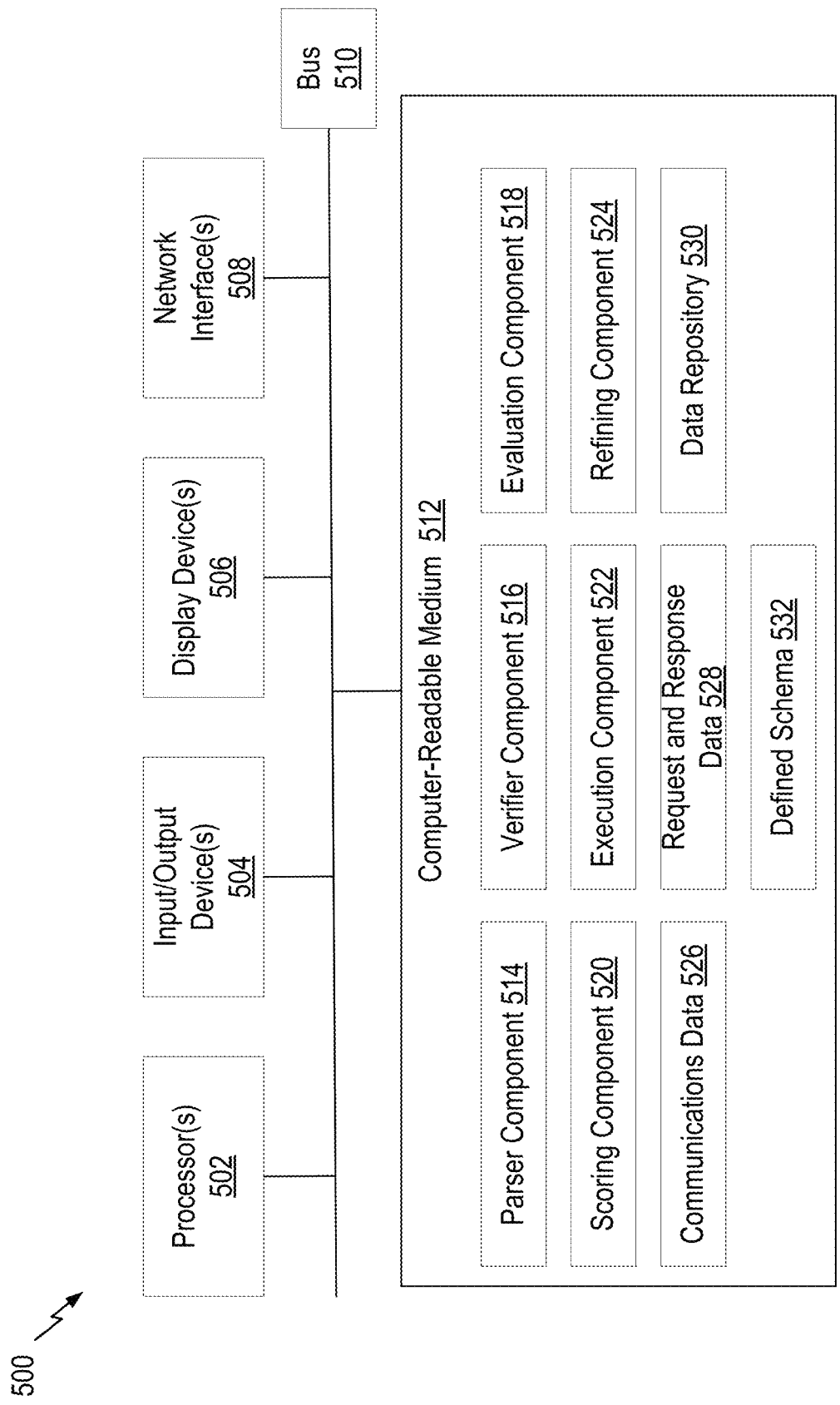
FIG. 5 depicts an example processing system with which aspects of the present disclosure can be performed.

FIG. 5 depicts an example processing system 500 configured to perform various aspects described herein, including, for example, method 400 as described above with respect to FIG. 4.

Processing system 500 is generally be an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 500 includes one or more processors 502, one or more input/output devices 504, one or more display devices 506, one or more network interfaces 508 through which processing system 500 is connected to one or more networks (e.g., a local network, an intranet, the Internet, or any other group of processing systems communicatively connected to each other), and computer-readable medium 512. In the depicted example, the aforementioned components are coupled by a bus 510, which may generally be configured for data exchange amongst the components. Bus 510 may be representative of multiple buses, while only one is depicted for simplicity.

Processor(s) 502 are generally configured to retrieve and execute instructions stored in one or more memories, including local memories like computer-readable medium 512, as well as remote memories and data stores. Similarly, processor(s) 502 are configured to store application data residing in local memories like the computer-readable medium 512, as well as remote memories and data stores. More generally, bus 510 is configured to transmit programming instructions and application data among the processor(s) 502, display device(s) 506, network interface(s) 508, and/or computer-readable medium 512. In certain aspects, processor(s) 502 are representative of one or more central processing units (CPUs), graphics processing unit (GPUs), tensor processing unit (TPUs), accelerators, and other processing devices.

Input/output device(s) 504 may include any device, mechanism, system, interactive display, and/or various other hardware and software components for communicating information between processing system 500 and a user of processing system 500. For example, input/output device(s) 504 may include input hardware, such as a keyboard, touch screen, button, microphone, speaker, and/or other device for receiving inputs from the user and sending outputs to the user.

Display device(s) 506 may generally include any sort of device configured to display data, information, graphics, user interface elements, and the like to a user. For example, display device(s) 506 may include internal and external displays such as an internal display of a tablet computer or an external display for a server computer or a projector. Display device(s) 506 may further include displays for devices, such as augmented, virtual, and/or extended reality devices. In various aspects, display device(s) 506 may be configured to display a graphical user interface.

Network interface(s) 508 provide processing system 500 with access to external networks and thereby to external processing systems. Network interface(s) 508 can generally be any hardware and/or software capable of transmitting and/or receiving data via a wired or wireless network connection. Accordingly, network interface(s) 508 can include a communication transceiver for sending and/or receiving any wired and/or wireless communication.

Computer-readable medium 512 may be a volatile memory, such as a random access memory (RAM), or a nonvolatile memory, such as nonvolatile random access memory (NVRAM), or the like. In this example, computer-readable medium 512 includes a parser component 514, a verifier component 516, an evaluation component 518, a scoring component 520, an execution component 522, a refining component 524, a communication component 526, request and response data 528, a data repository 530, and a defined schema 532.

In certain aspects, a parser component 514 is configured to assess a parsability of the GraphQL request with a parser, wherein the parsability of the GraphQL request indicates an adherence of the GraphQL request to a set of syntactical grammar rules associated with a language of the GraphQL request, such as described with respect to step 202 of FIG. 2 and step 402 of FIG. 4. In some aspects, the parser component 514 is configured to lexically analyze and parse a request.

In certain aspects, a verifier component 516 is configured to verifying an executability of the GraphQL request, wherein the executability of the GraphQL request indicates an operational validity of the GraphQL request, such as described with respect to step 202 of FIG. 2 and step 404 of FIG. 4.

In certain aspects, an evaluation component 518 is configured to evaluate a hierarchical correctness of the GraphQL request, wherein the hierarchical correctness of the GraphQL request indicates a depth of an error associated with the GraphQL request.

In certain aspects, a scoring component 520 is configured to assign an accuracy metric to the GraphQL request based on the parsability, the executability, and the hierarchical correctness of the GraphQL request, wherein the accuracy metric indicates a comprehensive assessment of the GraphQL request, such as described with respect to step 210 of FIG. 2.

In certain aspects, an execution component 522 is configured to the GraphQL request on a data repository 530 according to a defined schema 532 based on the accuracy metric satisfying an accuracy threshold, such as described with respect to step 216 of FIG. 2.

In certain aspects, a refining component 524 is configured to refine the GraphQL request based on the accuracy metric not satisfying an accuracy threshold, such as described with respect to step 214 of FIG. 2.

In certain aspects, a communication component 526 is configured to send and/or receive an API request and/or an API response, comprising request and response data 528.

Note that FIG. 5 is just one example of a processing system consistent with aspects described herein, and other processing systems having additional, alternative, or fewer components are possible consistent with this disclosure.

Example Clauses

Implementation examples are described in the following numbered clauses:

Clause 1: A method for evaluating a GraphQL request, comprising: assessing a parsability of the GraphQL request with a parser, wherein the parsability of the GraphQL request indicates an adherence of the GraphQL request to a set of syntactical grammar rules associated with a language of the GraphQL request; verifying an executability of the GraphQL request, wherein the executability of the GraphQL request indicates an operational validity of the GraphQL request; evaluating a hierarchical correctness of the GraphQL request, wherein the hierarchical correctness of the GraphQL request indicates a depth of an error associated with the GraphQL request; and assigning an accuracy metric to the GraphQL request based on the parsability, the executability, and the hierarchical correctness of the GraphQL request, wherein the accuracy metric indicates a comprehensive assessment of the GraphQL request.

Clause 2: The method of clause 1, further comprising executing the GraphQL request based on the accuracy metric satisfying an accuracy threshold.

Clause 3: The method of clause 1, further comprising refining the GraphQL request based on the accuracy metric not satisfying an accuracy threshold.

Clause 4: The method of any one of clauses 1-3, wherein assessing the parsability of the GraphQL request with the parser, comprises: parsing the GraphQL request based on the set of syntactical grammar rules; and assigning a parsability score to the GraphQL request, wherein the parsability score comprises a binary score indicating the GraphQL request is parsable or unparsable.

Clause 5: The method of any one of clauses 1-4, wherein verifying the executability of the GraphQL request, comprises: validating the GraphQL request against a schema associated with a GraphQL database for execution of the GraphQL request; and executing the GraphQL request in an isolated virtual machine to determine an executability score, wherein the executability score indicates an executability of the GraphQL request against the schema associated with the GraphQL database.

Clause 6: The method of clause 5, wherein the schema comprises at least one of one or more types and one or more associated fields, and one or more operators associated with the GraphQL database.

Clause 7: The method of any one of clauses 1-6, wherein evaluating the hierarchical correctness of the GraphQL request, comprises: modelling a hierarchy of the GraphQL request as a request tree, wherein the request tree comprises a set of nodes, each node of the set of nodes representing a token of the GraphQL request; categorizing each node of the set of nodes based on a depth of the node in the request tree, wherein the depth of the node indicates a closeness of the node to a root node in the set of nodes in the request tree; and assigning a hierarchical correctness score for each node of the set of nodes, wherein the hierarchical correctness score indicates an error associated the node and the depth of the error associated with the node.

Clause 8: The method of any one of clauses 1-7, wherein the hierarchical correctness score comprises a penalty associated with the depth of the error associated with the node, and the penalty is higher where the depth indicates the node is closer to the root node in the set of nodes in the request tree than to a leaf node in the set of nodes in the request tree, or the penalty is lower where the depth indicates the node is closer to the leaf node in the set of nodes than to the root node in the set of nodes in the request tree.

Clause 9: The method of any one of clauses 1-8, wherein assigning the accuracy metric to the GraphQL request based on the parsability, the executability, and the hierarchical correctness of the GraphQL request, comprises adjusting a weighting of the parsability to impart increased reliance on the adherence to the a set of syntactical grammar rules.

Clause 10: The method of any one of clauses 1-9, wherein assigning the accuracy metric to the GraphQL request based on the parsability, the executability, and the hierarchical correctness of the GraphQL request, comprises a weighting of the executability to impart increased reliance on the operational validity of the GraphQL request.

Clause 11: The method of any one of clauses 1-10, wherein assigning the accuracy metric to the GraphQL request based on the parsability, the executability, and the hierarchical correctness of the GraphQL request, comprises a weighting of the hierarchical correctness to impart increased reliance on the depth of the error associated with the GraphQL request.

Clause 12: A processing system, comprising: a memory comprising computer-executable instructions; and a processor configured to execute the computer-executable instructions and cause the processing system to perform a method in accordance with any one of Clauses 1-11.

Clause 13: A processing system, comprising means for performing a method in accordance with any one of Clauses 1-11.

Clause 14: A non-transitory computer-readable medium storing program code for causing a processing system to perform the steps of any one of Clauses 1-11.

Clause 15: A computer program product embodied on a computer-readable storage medium comprising code for performing a method in accordance with any one of Clauses 1-11.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for evaluating a GraphQL request, comprising:
    assessing a parsability of the GraphQL request with a parser, wherein the parsability of the GraphQL request indicates an adherence of the GraphQL request to a set of syntactical grammar rules associated with a language of the GraphQL request;
    verifying an executability of the GraphQL request, wherein the executability of the GraphQL request indicates an operational validity of the GraphQL request;
    evaluating a hierarchical correctness of the GraphQL request, wherein the hierarchical correctness of the GraphQL request indicates a depth of an error associated with the GraphQL request; and
    assigning an accuracy metric to the GraphQL request based on the parsability, the executability, and the hierarchical correctness of the GraphQL request, wherein the accuracy metric indicates a comprehensive assessment of the GraphQL request.

2. The method of claim 1, further comprising executing the GraphQL request based on the accuracy metric satisfying an accuracy threshold.

3. The method of claim 1, further comprising refining the GraphQL request based on the accuracy metric not satisfying an accuracy threshold.

4. The method of claim 1, wherein assessing the parsability of the GraphQL request with the parser, comprises:
    parsing the GraphQL request based on the set of syntactical grammar rules; and
    assigning a parsability score to the GraphQL request, wherein the parsability score comprises a binary score indicating the GraphQL request is parsable or unparsable.

5. The method of claim 1, wherein verifying the executability of the GraphQL request, comprises:
    validating the GraphQL request against a schema associated with a GraphQL database for execution of the GraphQL request; and
    executing the GraphQL request in an isolated virtual machine to determine an executability score, wherein the executability score indicates an executability of the GraphQL request against the schema associated with the GraphQL database.

6. The method of claim 5, wherein the schema comprises at least one of one or more types and one or more associated fields, and one or more operators associated with the GraphQL database.

7. The method of claim 1, wherein evaluating the hierarchical correctness of the GraphQL request, comprises:
    modelling a hierarchy of the GraphQL request as a request tree, wherein the request tree comprises a set of nodes, each node of the set of nodes representing a token of the GraphQL request;
    categorizing each node of the set of nodes based on a depth of the node in the request tree, wherein the depth of the node indicates a closeness of the node to a root node in the set of nodes in the request tree; and
    assigning a hierarchical correctness score for each node of the set of nodes, wherein the hierarchical correctness score indicates an error associated the node and the depth of the error associated with the node.

8. The method of claim 7, wherein the hierarchical correctness score comprises a penalty associated with the depth of the error associated with the node, and the penalty is higher where the depth indicates the node is closer to the root node in the set of nodes in the request tree than to a leaf node in the set of nodes in the request tree, or the penalty is lower where the depth indicates the node is closer to the leaf node in the set of nodes than to the root node in the set of nodes in the request tree.

9. The method of claim 1, wherein assigning the accuracy metric to the GraphQL request based on the parsability, the executability, and the hierarchical correctness of the GraphQL request, comprises adjusting a weighting of the parsability to impart increased reliance on the adherence to the set of syntactical grammar rules.

10. The method of claim 1, wherein assigning the accuracy metric to the GraphQL request based on the parsability, the executability, and the hierarchical correctness of the GraphQL request, comprises a weighting of the executability to impart increased reliance on the operational validity of the GraphQL request.

11. The method of claim 1, wherein assigning the accuracy metric to the GraphQL request based on the parsability, the executability, and the hierarchical correctness of the GraphQL request, comprises a weighting of the hierarchical correctness to impart increased reliance on the depth of the error associated with the GraphQL request.

12. A processing system for evaluating a GraphQL request, comprising: a memory comprising computer-executable instructions; and a processor configured to execute the computer-executable instructions and cause the processing system to:
assess a parsability of the GraphQL request with a parser, wherein the parsability of the GraphQL request indicates an adherence of the GraphQL request to a set of syntactical grammar rules associated with a language of the GraphQL request;
verify an executability of the GraphQL request, wherein the executability of the GraphQL request indicates an operational validity of the GraphQL request;
evaluate a hierarchical correctness of the GraphQL request, wherein the hierarchical correctness of the GraphQL request indicates a depth of an error associated with the GraphQL request; and
assign an accuracy metric to the GraphQL request based on the parsability, the executability, and the hierarchical correctness of the GraphQL request, wherein the accuracy metric indicates a comprehensive assessment of the GraphQL request.

13. The processing system of claim 12, wherein the processor is further configured to cause the processing system to execute the GraphQL request based on the accuracy metric satisfying an accuracy threshold.

14. The processing system of claim 12, wherein the processor is further configured to cause the processing system to refine the GraphQL request based on the accuracy metric not satisfying an accuracy threshold.

15. The processing system of claim 12, wherein to assess the parsability of the GraphQL request with the parser, the processor is further configured to cause the processing system to:
parse the GraphQL request based on the set of syntactical grammar rules; and
assign a parsability score to the GraphQL request, wherein the parsability score comprises a binary score indicating the GraphQL request is parsable or unparsable.

16. The processing system of claim 12, wherein to verify the executability of the GraphQL request, the processor is further configured to cause the processing system to:
validate the GraphQL request against a schema associated with a GraphQL database for execution of the GraphQL request; and
execute the GraphQL request in an isolated virtual machine to determine an executability score, wherein the executability score indicates an executability of the GraphQL request against the schema associated with the GraphQL database.

17. The processing system of claim 16, wherein the schema comprises at least one of one or more types and one or more associated fields, and one or more operators associated with the GraphQL database.

18. The processing system of claim 12, wherein to evaluate the hierarchical correctness of the GraphQL request, the processor is further configured to cause the processing system to:
model a hierarchy of the GraphQL request as a request tree, wherein the request tree comprises a set of nodes, each node of the set of nodes representing a token of the GraphQL request;
categorize each node of the set of nodes based on a depth of the node in the request tree, wherein the depth of the node indicates a closeness of the node to a root node in the set of nodes in the graph; and
assign a hierarchical correctness score for each node of the set of nodes, wherein the hierarchical correctness score indicates an error associated the node and the depth of the error associated with the node.

19. The processing system of claim 18, wherein the hierarchical correctness score comprises a penalty associated with the depth of the error associated with the node, and the penalty is higher where the depth indicates the node is closer to the root node in the set of nodes in the request tree than to a leaf node in the set of nodes in the request tree, or the penalty is lower where the depth indicates the node is closer to the leaf node in the set of nodes than to the root node in the set of nodes in the request tree.

20. A method for evaluating a GraphQL request, comprising:
assessing a parsability of the GraphQL request with a parser, wherein the parsability of the GraphQL request indicates an adherence of the GraphQL request to a set of syntactical grammar rules associated with a language of the GraphQL request, comprising:
parsing the GraphQL request based on the set of syntactical grammar rules; and
assigning a parsability score to the GraphQL request, wherein the parsability score comprises a binary score indicating the GraphQL request is parsable or unparsable;
verifying an executability of the GraphQL request, wherein the executability of the GraphQL request indicates an operational validity of the GraphQL request, comprising:
validating the GraphQL request against a schema associated with a GraphQL database for execution of the GraphQL request; and
executing the GraphQL request in an isolated virtual machine to determine an executability score, wherein the executability score indicates an executability of the GraphQL request against the schema associated with the GraphQL database;

evaluating a hierarchical correctness of the GraphQL request, wherein the hierarchical correctness of the GraphQL request indicates a depth of an error associated with the GraphQL request, comprising:

modelling a hierarchy of the GraphQL request as a request tree, wherein the request tree comprises a set of nodes, each node of the set of nodes representing a token of the GraphQL request;

categorizing each node of the set of nodes based on a depth of the node in the request tree, wherein the depth of the node indicates a closeness of the node to a root node in the set of nodes in the request tree; and assigning a hierarchical correctness score for each node of the set of nodes, wherein the hierarchical correctness score indicates an error associated the node and the depth of the error associated with the node; and assigning an accuracy metric to the GraphQL request based on the parsability, the executability, and the hierarchical correctness of the GraphQL request, wherein the accuracy metric indicates a comprehensive assessment of the GraphQL request.

* * * * *